Nov. 13, 1945.    J. O. IVERSON    2,388,918
HYDROGEN FLUORIDE ALKYLATION PROCESS
Filed July 30, 1941
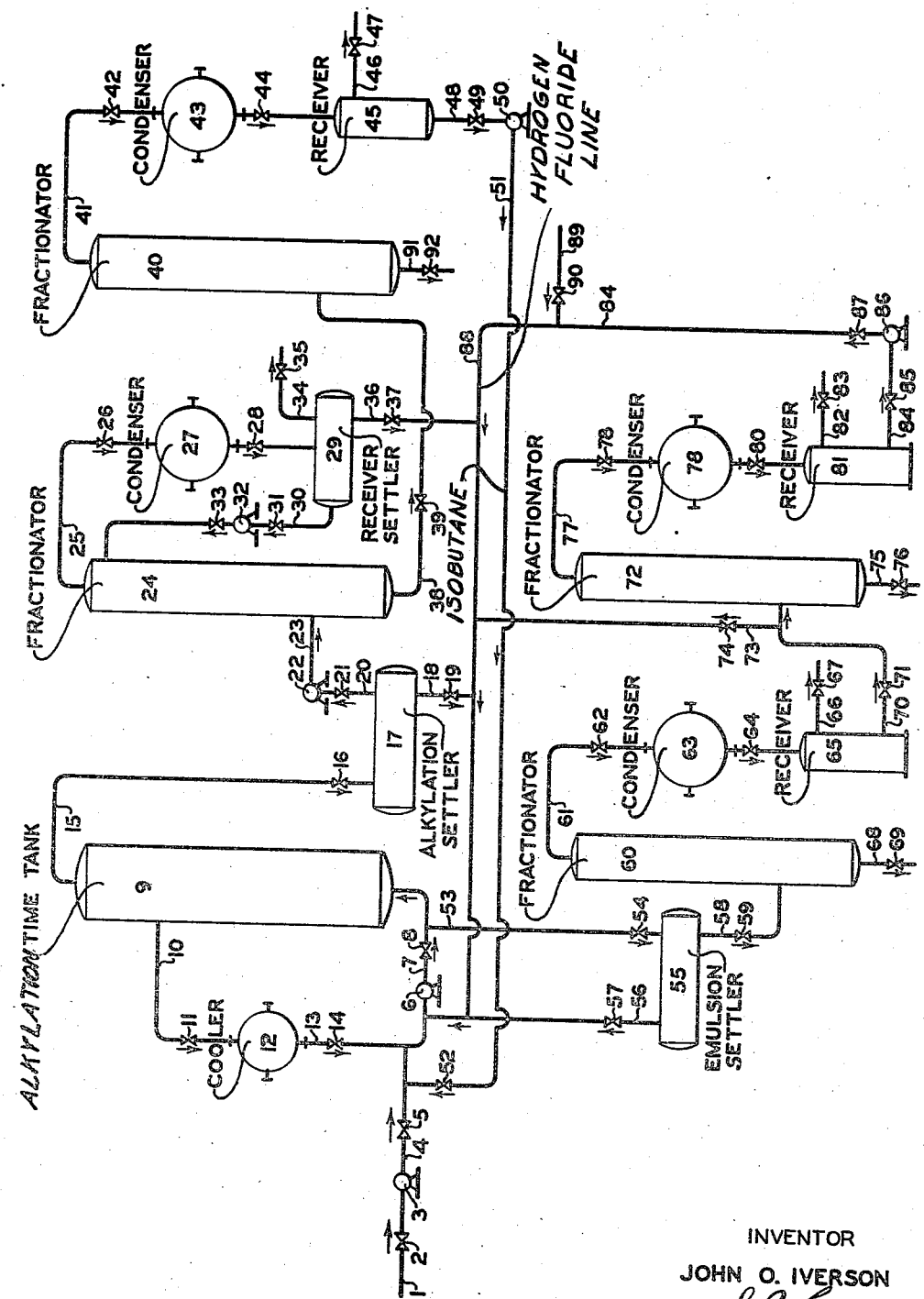
INVENTOR
JOHN O. IVERSON
BY
ATTORNEY Patented Nov. 13, 1945

2,388,918

UNITED STATES PATENT OFFICE 2,388,918

HYDROGEN FLUORIDE ALKYLATION PROCESS

John O. Iverson, Chicago, Ill., assignor to Universal Oil Products Company, Chicago, Ill., a corporation of Delaware Application July 30, 1941, Serial No. 404,607

6 Claims. (Cl. 260—683.4)

This invention relates to an improved process for the reaction of isoparaffins with olefins in the presence of a hydrogen fluoride catalyst and is more particularly concerned with a combination of related and cooperative steps whereby the process may be operated more efficiently.

The reaction of isoparaffins with olefins in the presence of hydrogen fluoride as a catalyst has been heretofore proposed as a method of producing a valuable motor fuel of high antiknock value, suitable for aviation engines and as a blending agent to increase the antiknock rating of other motor fuels. In previously known processes for reacting isoparaffins with olefins, a liquid mixture of isoparaffins and olefins was agitated together with liquid hydrogen fluoride until the reaction was complete, and the resultant mixture was then allowed to settle in order to separate the hydrocarbon product from the hydrogen fluoride. Heretofore, no adequate provision was made for reactivating or recovering the catalyst in a continuous manner. In this invention, several steps have been included for recovering and reactivating the hydrogen fluoride catalyst which will materially reduce the cost of the catalyst for the process and for therefore highly desirable from a commercial viewpoint.

One specific embodiment of the present invention comprises a process for reacting isobutane with butylenes which includes charging a normally gaseous feed containing isobutane and butylenes together with recycled isobutane, under sufficient pressure to maintain them in the liquid phase, to a reaction zone, wherein the hydrocarbons are intimately mixed with a liquid hydrogen fluoride catalyst at an alkylating temperature for a time sufficient to complete the reaction between the isoparaffins and olefins and form an emulsion of hydrocarbon products and hydrogen fluoride, discharging said emulsion of hydrocarbon products and hydrogen fluoride to a settling zone where a substantial proportion of the hydrogen fluoride is separated from hydrocarbon products, returning said hydrogen fluoride to the reaction zone, subjecting the separated hydrocarbon products to a first fractionation to remove propane and dissolved hydrogen fluoride overhead as a vapor from a reflux condensate, condensing and returning the hydrogen fluoride to the reaction zone, subjecting said reflux condensate to a second fractionation in order to remove an isobutane fraction from a second reflux condensate, returning said isobutane fraction to the reaction zone, further fractionating and treating said second reflux condensate to produce a high octane motor fuel, continuously withdrawing from the reaction zone a stream of used hydrogen fluoride catalyst, separately fractionating said used hydrogen fluoride to remove purified hydrogen fluoride vapors and any light hydrocarbons overhead from a third reflux condensate comprising essentially polymers, and withdrawing said third reflux condensate, subjecting a portion of the purified hydrogen fluoride to a still further fractional distillation whereby to separate relatively dry hydrogen fluoride as a vaporous product and a mixture of water and hydrogen fluoride as reflux condensate, and condensing and returning the purified and dried hydrogen fluoride to the reaction zone.

Hydrogen fluoride is slightly soluble in hydrocarbons. Therefore, the products from the reaction zone will contain a small amount of the order of 1% of dissolved hydrogen fluoride. The fractionation step following the reaction zone is operated so as to remove any propane or other light gases present and also the dissolved hydrogen fluoride. In order to remove the hydrogen fluoride which has a higher boiling point than either butane or propane, it is necessary to vaporize a relatively large quantity of hydrocarbons. If no propane is to be removed from the reaction products, the hydrogen fluoride may be removed by vaporizing, condensing, and refluxing higher boiling hydrocarbons. This step of removing and recovering the dissolved hydrogen fluoride from the product is important because its presence in the finished product would present a serious corrosion problem and possible health hazard and would increase the amount of catalyst that would have to be added to the process.

The hydrogen fluoride catalyst tends to lose a substantial proportion of its activity after a period of use. This decrease in activity is mainly due to two factors, namely, the contamination of the hydrogen fluoride with organic material and the dilution with water. Although it is not known whether the nature of the contamination is a solution effect or a loose chemical combination, it has been discovered that this contaminating organic material can be removed and the activity of the catalyst restored by heating and distilling off the active hydrogen fluoride. An organic material containing hydrocarbon polymers remains after the distillation.

Hydrogen fluoride has a greater affinity for water and it is very difficult to remove water from the catalyst by any ordinary dehydrating methods. Although the incoming charge may be very nearly dry, nevertheless, the catalyst will gradually accumulate water. This water not only reduces the catalyst activity, but also makes the hydrogen fluoride more corrosive to the apparatus in which it is handled. It is desirable to maintain the concentration of water in the hydrogen fluoride below about 10%.

In the process of this invention, the water is removed from the catalyst in a fractionation step in which substantially dry hydrogen fluoride is distilled off and a mixture of hydrogen fluoride and water is withdrawn as reflux condensate. This mixture may be a constant boiling mixture containing about 35 to 40% of hydrogen fluoride or some other mixture of higher hydrogen fluoride content.

Any suitable apparatus or reactor may be employed to contact the hydrocarbon reactants with the liquid catalyst in the reaction zone. It is only essential that very intimate contact between the two liquids be maintained for a period of time sufficient for the reaction. In general, some form of agitation, such as mixing, stirring, etc., is used, which forms an intimate mixture or emulsion of hydrocarbon and hydrogen fluoride. In one particular form of apparatus illustrated in the drawing, this agitation is obtained by continuously recycling a large portion of the reactants in the time tank through an external cooler and causing this emulsion to pass through rather small openings in a series of horizontal plates placed in the time tank whereby intimate contact is maintained between the hydrogen fluoride and hydrocarbon phases. A stream of fresh reactants is continuously added to the recirculating emulsion and a portion of the reaction products is continuously withdrawn from the recirculating emulsion. A settling section is provided in the time tank above the outlet to the recirculation line where most of the hydrogen fluoride in the portion of the withdrawn reaction products can settle back into the recirculating stream. This settling section may eliminate the necessity for an outside settler as it is possible to remove all of the residual hydrogen fluoride carried over with the reaction products in the propane removal fractionating column.

The accompanying diagrammatic drawing illustrates one specific form of apparatus embodying the features of the invention and in which the process of the invention may be conducted.

Referring to the drawing, a normally gaseous charge consisting essentially of isobutane, butylenes, and butane is passed as a liquid under pressure through line 1, valve 2, and charge pump 3 to line 4. The charge is combined in line 4 with a recycled isobutane fraction from line 51. The combined feed from line 4 is then admitted to line 13 containing a recirculating emulsion of hydrogen fluoride and hydrocarbons. The resultant commingled mixture is then passed through pump 6, line 7 and valve 8 to time tank 9, in which the interaction of olefinic and isoparaffinic hydrocarbons is substantially completed. A large portion of the emulsion of hydrocarbons and hydrogen fluoride from time tank 9 is withdrawn through line 10 and valve 11, through cooler 12, wherein a portion of the heat of reaction is removed and thence through line 13 and valve 14 into recirculating pump 6. The combination of time tank 9 with the emulsion recirculating system comprises the reaction zone.

A smaller portion of the emulsion of hydrocarbon and hydrogen fluoride from time tank 9 passes through line 15, valve 16 to alkylation settler 17, wherein hydrogen fluoride is settled out into a lower layer and withdrawn through line 18 and valve 19 as shown later. The hydrocarbon from alkylation settler 17 passes through line 20, valve 21, pump 22, and line 23 to fractionator 24. The vapors from fractionator 24 pass through line 25 and valve 26, condenser 27, and valve 28 to receiver 29. This fractionation column removes the propane and dissolved hydrogen fluoride from the product. However, it is necessary to reflux a large amount of hydrocarbon in order to remove all of the dissolved hydrogen fluoride. This reflux is returned from receiver 29 through line 30, valve 31, pump 32, and valve 33 to the upper portion of fractionator 24. Any gaseous propane that may be present is removed through line 34 and valve 35. The hydrogen fluoride which separates as a heavy lower layer in the bottom of receiver 29 will be withdrawn through line 36 and valve 37 to be returned to the process as shown later. The reflux condensate from fractionator 24 is withdrawn through line 38 and valve 39 and directed to a second fractionation step in fractionator 40. From this fractionation the overhead product, consisting mainly of isobutane, is withdrawn through line 41, valve 42, condenser 43 and valve 44 to receiver 45. Any non-condensable gases present will be removed through line 46 and valve 47. The liquid isobutane passes through line 48, valve 49, pump 50, line 51, and valve 52 to the beginning of the process where it is combined with the charge in line 4. A product consisting of n-butane and alkylate is withdrawn through line 91 and valve 92.

In order to maintain the catalyst activity in the reaction system, a small portion of the catalyst is continuously reactivated as hereinafter described. A stream of hydrocarbon and hydrogen fluoride emulsion is withdrawn from emulsion circulating line 7 through line 53 and valve 54 to an emulsion settler 55, wherein the hydrogen fluoride settles out. The hydrocarbon layer substantially freed from hydrogen fluoride is returned to the reaction zone through line 56 and valve 57. Hydrogen fluoride catalyst containing organic contaminating materials is passed from emulsion settler 55 through line 58 and valve 59 to fractionator 60 wherein a separation is effected into a purified hydrogen fluoride fraction, taken overhead through line 61 and valve 62, condenser 63 and valve 64 to receiver 65 equipped with conventional gas release, line 66 and valve 67; and a hydrocarbon fraction, consisting essentially of heavy polymers, the latter being withdrawn from the bottom of fractionator 60 through line 68 and valve 69. A small amount of light hydrocarbons may also be carried overhead with the hydrogen fluoride. The purified liquid hydrogen fluoride in receiver 65 is withdrawn through line 70 and valve 71 and is then divided into two streams, the one passing through line 70 to fractionator 72, and the other passing through line 73 and valve 74 to be recycled to the alkylation stage of the process as will be described later.

In fractionator 72, any water that is present in the hydrogen fluoride is removed in the reflux condensate as a constant boiling mixture of water and hydrogen fluoride through line 75 and valve 76. Dry hydrogen fluoride is withdrawn overhead from fractionator 72 through line 77, valve 78, condenser 79 and valve 80 to receiver 81. Provision is made for the removal of any non-condensable gases from this receiver through line 82 and valve 83. The purified and dried liquid hydrogen fluoride passes through line 84, valve 85, pump 86 and valve 87 to be returned to the reaction zone. The combined streams of hydrogen fluoride from lines 84, 36, 18, and 73 are returned through line 88 and line 56 to line 13 and the reaction zone. Fresh hydrogen fluoride catalyst may be added when necessary through line 89 and valve 90.

It will, of course, be understood that the invention is not limited to the specific form of apparatus illustrated and above described, since other forms of apparatus may be utilized to accomplish substantially the same results. For instance, the reactivation of the hydrogen fluoride catalyst may be carried out in a slightly different form of apparatus not shown in the drawing. The used hydrogen fluoride catalyst which has been separated from the hydrocarbon phase is subjected to fractional distillation in a first fractionating column operated under suitable conditions to separate relatively dry hydrogen fluoride and some normally gaseous hydrocarbons overhead from a reflux condensate which will consist of a hydrogen fluoride-water mixture containing a higher percentage of water than the charge but not enough water to be excessively corrosive, and contaminating organic material.

The reflux condensate from this first fractionation is again subjected to fractional distillation in a second fractionating column at a somewhat higher temperature to decompose the alkyl fluorides and to remove another relatively dry hydrogen fluoride fraction together with some hydrocarbons from a second reflux condensate which will consist of a heavy organic liquid phase and a liquid phase containing hydrogen fluoride and water; either the constant boiling mixture or a mixture containing a higher proportion of hydrogen fluoride than the constant boiling mixture.

One difficulty involved in the above described catalyst regeneration processes is in controlling the fractional distillation so that the more corrosive constant boiling mixture of hydrogen fluoride and water does not accumulate in any part of the apparatus where it would be harmful. In the apparatus shown in the drawing, any danger of the constant boiling mixture accumulating in the first regeneration column is eliminated by maintaining the top temperature of the fractionator sufficiently high to insure that the water is carried overhead. A constant boiling mixture vaporizes at approximately 235° F. at atmospheric pressure, and at higher temperatures with elevated pressures.

The second catalyst regeneration fractionator shown in the drawing will ordinarily be quite small and can be built of materials that will withstand the corrosive effects of hydrogen fluoride-water mixtures which accumulate and are withdrawn as reflux condensate.

The preferred range of operating conditions which may be employed in an apparatus such as illustrated and above described for conducting the processes of the invention, may be approximately as follows:

The pressure at the outlet of the charge pump 3 and in the reaction zone may be from 125 to 200 pounds per square inch. It is only necessary to use enough pressure to maintain both catalyst and hydrocarbon in the liquid phase. The temperature in the reaction zone may be in the neighborhood of 100 to 125° F., although the reaction will occur at temperatures below 0° F.

The time of contact between the hydrogen fluoride catalyst and the hydrocarbon charge, defined as the volume of catalyst in the reaction zone divided by the volume per minute of hydrocarbon feed to the reaction zone may be from about 5 to about 80 minutes. Although the ratio of hydrocarbon to hydrogen fluoride in the reaction zone may vary considerably, a suitable ratio will be in the range of 0.5 to 20 parts of hydrocarbon to 1 part of hydrogen fluoride. The ratio of isoparaffin to olefin in the reaction zone may also vary considerably depending upon other conditions, but will ordinarily be in the range of from 1 to 10 molecular proportions of isoparaffin per one molecular proportion of olefin.

As a specific example of an operation of the process as it may be conducted in an apparatus such as illustrated and above described: The charging stock is a refinery gas containing 33% isobutane, 31% of butylenes, and the rest essentially normal butane and small amounts of propane. It is under sufficient pressure to be a liquid as supplied to line 1 and is discharged from pump 3 at a pressure of 150 pounds per square inch, combined with an isobutane recycle fraction through line 51 and then an emulsion of hydrocarbons and hydrogen fluoride through line 13, and the total material is then passed through pump 6, after which the pressure is 190 pounds per square inch. Therefore, the pressure drop in the emulsion recirculation system is about 40 pounds per square inch. The reacted material withdrawn through line 15 and valve 16 is separated into a hydrogen fluoride layer and a hydrocarbon layer and the hydrocarbon layer is pumped through line 23 to fractionator 24. In this fractionator, small amounts of propane and hydrogen fluoride are removed. The reflux condensate is again fractionated in fractionator 40 to remove the unreacted isobutane which is recycled through line 51 and valve 52 to the beginning of the process. The ratio of isobutane to olefins in the charge is approximately 1 to 1. However, when the recycled isobutane is combined with the charge, the ratio of isobutane to olefins becomes approximately 5 to 1. From the bottom of fractionator 40, a product is withdrawn which contains 53% normal butane and 47% alkylated hydrocarbon. This material may be fractionated further by means not shown in the drawing, to remove butane and high boiling alkylate and the desired fraction may then be blended with isopentane and leaded or otherwise treated to produce a finished aviation gasoline.

For the reactivation of the used hydrogen fluoride catalyst the ratio of the volume of catalyst regenerated to alkylate produced is approximately 1 to 30. This is sufficient to maintain the activity of the catalyst. The difference in pressure between the suction and discharge of the recirculating pump 6 is about 40 pounds per square inch and is sufficient to recirculate the emulsion through the emulsion settler. The flow through the emulsion settler is normally controlled by valve 57. The hydrogen fluoride layer is removed from emulsion settler through line 58 to the catalyst regeneration fractionator 60. This fractionator is operated at a pressure of 180 pounds per square inch, at a temperature sufficiently high to decompose the contaminating compounds and to remove hydrogen fluoride and water overhead. A portion of the hydrocarbon vapors is condensed and refluxed to the top of the fractionator. Only small amounts of heavy polymers are withdrawn from the bottom of fractionator 60 through line 68. The pressure in fractionator 60 is substantially the same as that at the outlet of pump 6. The amount of purified hydrogen fluoride being sent to fractionator 72 to remove the water present, depends upon the amount of water present in the charge.

Although the example given describes a process for alkylating isobutane with butylenes, the invention is not limited to this process but may also be applied to the alkylation of other isoparaffins such as isopentane with other olefins such as propylene or pentenes.

I claim as my invention:

1. A process for reacting isoparaffins with olefins to produce saturated branched chain hydrocarbons which comprises subjecting a hydrocarbon mixture containing substantial proportions of said isoparaffins and said olefins to contact under alkylating conditions with hydrogen fluoride catalyst, separating the conversion products from the hydrogen fluoride, subjecting said conversion products to fractional distillation to remove light gases and dissolved hydrogen fluoride, withdrawing the alkylate as a reflux condensate, condensing and returning vaporous hydrogen fluoride from said fractional distillation to the reaction zone, separating from the reaction zone and fractionally distilling in a second fractionation zone a stream of used hydrogen fluoride whereby to separate organic material as reflux condensate and purified hydrogen fluoride as a vapor, condensing and returning a portion of the purified hydrogen fluoride to the reaction zone, subjecting another portion of the purified hydrogen fluoride to fractional distillation in a third fractionation zone whereby to separate a mixture of water and hydrogen fluoride as reflux condensate and substantially water-free hydrogen fluoride as a vapor and condensing and returning the substantially water-free hydrogen fluoride to the reaction zone.

2. A process for reacting isobutane with butylenes to produce saturated branched chain hydrocarbons which comprises subjecting a normally gaseous hydrocarbon mixture containing substantial proportions of isobutane and butylenes to contact under alkylating conditions with a hydrogen fluoride catalyst, separating the hydrocarbon conversion products from the hydrogen fluoride, subjecting said conversion products to a first fractional distillation to remove propane and dissolved hydrogen fluoride from a reflux condensate, condensing and returning the hydrogen fluoride from said first fractional distillation to the reaction zone, subjecting said reflux condensate to a second fractional distillation whereby to separate an isobutane fraction from a second reflux condensate, withdrawing said second reflux condensate from said second fractional distillation as an alkylate product, condensing and returning said isobutane fraction to the reaction zone, separating a stream of used hydrogen fluoride from the reaction zone and fractionally distilling it in a third fractionation zone whereby to separate organic material as reflux condensate, and purified hydrogen fluoride as a vapor, condensing and returning a portion of the purified hydrogen fluoride to the reaction zone, subjecting another portion of the purified hydrogen fluoride to fractional distillation in a fourth fractionation zone whereby to separate a mixture of water and hydrogen fluoride as reflux condensate and substantially water-free hydrogen fluoride as a vapor, and condensing and returning the substantially water-free hydrogen fluoride to the reaction zone.

3. In a process for reacting isoparaffins with olefins to produce saturated branched chain hydrocarbons in which a hydrocarbon mixture containing substantial proportions of said isoparaffins and said olefins is subjected to alkylation conditions in the presence of a hydrogen fluoride catalyst, the improvement which comprises separating a stream of used hydrogen fluoride from the alkylation reaction zone and subjecting it to a first fractional distillation whereby to separate organic material as reflux condensate and purified hydrogen fluoride as a vapor, condensing and returning one portion of the purified hydrogen fluoride to said reaction zone, subjecting a second portion of the purified hydrogen fluoride to a second fractional distillation whereby to separate a mixture of water and hydrogen fluoride as reflux condensate and returning substantially water-free hydrogen fluoride to the reaction zone.

4. In the alkylation of hydrocarbons by reaction thereof in the presence of a hydrogen fluoride catalyst, the method which comprises removing from the alkylating step a stream of used catalyst containing hydrogen fluoride, hydrocarbons and water, subjecting said used catalyst to fractional distillation to separate hydrogen fluoride and water as an overhead product from hydrocarbons, returning a portion of said overhead product to the alkylating step, subjecting another portion thereof to further fractional distillation to separate relatively dry hydrogen fluoride therefrom, and returning relatively dry hydrogen fluoride from the last-mentioned factional distillation to the alkylating step.

5. In the conversion of hydrocarbons by reaction thereof in the presence of a hydrogen fluoride catalyst, the method which comprises removing from the hydrocarbon conversion step a liquid stream of used catalyst containing hydrogen fluoride, hydrocarbons and water, vaporizing hydrogen fluoride and water from said used catalyst and separating the vapors from residual hydrocarbons, condensing the commingled hydrogen fluoride and water vapors and returning a portion of the resultant condensate to the hydrocarbon conversion step, fractionating another portion of said condensate to separate relatively dry hydrogen fluoride therefrom and returning the latter to the hydrocarbon conversion step.

6. In the alkylation of isoparaffins with olefins in the presence of a hydrogen fluoride catalyst, the method which comprises removing from the alkylating step a liquid stream of used catalyst containing hydrogen fluoride, hydrocarbons and water, vaporizing hydrogen fluoride and water from said used catalyst and separating the vapors from residual hydrocarbons, condensing the commingled hydrogen fluoride and water vapors and returning a portion of the resultant condensate to the alkylating step, fractionating another portion of said condensate to separate relatively dry hydrogen fluoride therefrom and returning the latter to the alkylating step.

JOHN O. IVERSON.